United States Patent
Nishino

(10) Patent No.: US 7,902,291 B2
(45) Date of Patent: Mar. 8, 2011

(54) AQUEOUS POLYURETHANE RESIN COMPOSITION AND ONE-COMPONENT ADHESIVE AGENT AND LAMINATED BODY THAT USE THE SAME, AND METHOD FOR MANUFACTURING AQUEOUS POLYURETHANE RESIN COMPOSITION

(75) Inventor: Masakazu Nishino, Fukui (JP)

(73) Assignee: NICCA Chemical Co., Ltd., Fukui (JP)

( * ) Notice: Subject to any disclaimer, the term of this patent is extended or adjusted under 35 U.S.C. 154(b) by 54 days.

(21) Appl. No.: 12/310,464

(22) PCT Filed: Mar. 27, 2008

(86) PCT No.: PCT/JP2008/055939
§ 371 (c)(1),
(2), (4) Date: Feb. 25, 2009

(87) PCT Pub. No.: WO2008/120688
PCT Pub. Date: Oct. 9, 2008

(65) Prior Publication Data
US 2010/0004386 A1    Jan. 7, 2010

(30) Foreign Application Priority Data

Mar. 30, 2007 (JP) .................................. 2007-093534

(51) Int. Cl.
B32B 27/00 (2006.01)
B32B 27/40 (2006.01)
C08G 18/08 (2006.01)
C08J 3/00 (2006.01)
C08K 3/20 (2006.01)
C08L 75/00 (2006.01)

(52) U.S. Cl. ...................... 524/591; 428/423.1; 524/839; 524/840

(58) Field of Classification Search .................. 524/591, 524/839, 840; 428/423.1
See application file for complete search history.

(56) References Cited

U.S. PATENT DOCUMENTS
2002/0111424 A1   8/2002   Takanashi et al.
2006/0167203 A1   7/2006   Endo et al.

FOREIGN PATENT DOCUMENTS

| JP | 64-069619 | 3/1989 |
| JP | 06-313024 | 11/1994 |
| JP | 8-27243 | 1/1996 |
| JP | 10-265539 | 10/1998 |
| JP | 11-349914 | * 12/1999 |
| JP | 2002-275230 | 9/2002 |
| JP | 2004-91740 | 3/2004 |

OTHER PUBLICATIONS

Machine English translation of JP 11-349914.*

* cited by examiner

*Primary Examiner* — Patrick D Niland
(74) *Attorney, Agent, or Firm* — Fitch, Even, Tabin & Flannery

(57) ABSTRACT

An aqueous polyurethane resin composition obtained by:
obtaining a neutralized prepolymer having a terminal isocyanate group by reacting a polyisocyanate (A) and a polyfunctional compound (B) containing a polyester polyol ($B_1$) having an acidic group and at least one member selected from the group consisting of other polyols ($B_2$) and chain extenders ($B_3$) so as to satisfy a condition expressed by the following mathematical formula (1); and
subjecting the neutralized prepolymer having a terminal isocyanate group to a chain elongation reaction with the use of a polyamine (C) containing at least two groups selected from the group consisting of an amino group and an imino group and water (D) so as to satisfy conditions expressed by the following mathematical formulas (2) and (3) to obtain a elongated product, and then dispersing the elongated product into water:

$$100/80 \leq a/b \leq 100/40 \quad (1)$$

$$100/98 \leq a/(b+c) \leq 100/80 \quad (2)$$

$$100/105 \leq a/(b+c+2d) \leq 100/95 \quad (3)$$

(in formulas (1) to (3), a represents the number of isocyanate groups (NCO) contained in the polyisocyanate (A), b represents the number of hydroxyl groups (OH) contained in the polyfunctional compound (B), c represents the number of the groups selected from the group consisting of an amino group ($NH_2$) and an imino group (NH) contained in the polyamine (C), and d represents the number of moles of the water (D)).

4 Claims, No Drawings

AQUEOUS POLYURETHANE RESIN COMPOSITION AND ONE-COMPONENT ADHESIVE AGENT AND LAMINATED BODY THAT USE THE SAME, AND METHOD FOR MANUFACTURING AQUEOUS POLYURETHANE RESIN COMPOSITION

CROSS-REFERENCE TO RELATED APPLICATIONS

This is a U.S. National Phase of International Application PCT/JP2008/055939, filed Mar. 27, 2008, and claims foreign priority under 35 U.S.C. §119 based on Japanese Application No. 2007-093534, filed Mar. 30, 2007, the entire disclosures of which applications are hereby incorporated herein by reference.

TECHNICAL FIELD

The present invention relates to an aqueous polyurethane resin composition and a one-component adhesive agent and a laminated body that use the same, and to a method for manufacturing the aqueous polyurethane resin composition.

BACKGROUND OF THE INVENTION

Generally, for manufacturing of a laminated body by pasting various film sheets made of rubber, metal, paper, fiber, wood, glass, polyvinyl chloride, polyolefin, and the like and various substrates made of foamed materials and the like, adhesive agents containing a resin dissolved in an organic solvent have been conventionally used in many cases.

Then, for manufacturing of a laminated body, for example, a dry laminate method has been widely adopted in which an adhesive agent containing a resin dissolved in an organic solvent is applied onto a substrate, the adhesive agent is dried so as to volatilize the organic solvent, and then the substrate is pasted to another substrate.

As for an adhesive agent containing an organic solvent-based resin, mainly available are: a two-component adhesive agent that is made of a polyurethane resin serving as a base compound and having a hydroxyl group, an amide group, or the like, having an active hydrogen which is reactive to an isocyanate group, and a polyisocyanate-based curing agent; and a one-component adhesive agent that contains a polyurethane resin.

Such a two-component adhesive agent has advantages of having a long period of time (that is, an open time) from the time when the adhesive agent is dried after applied onto a substrate to the time when the adhesiveness disappears, and of having superior adhesiveness at a low temperature in a range approximately from 30 to 60° C. Accordingly, the two-component adhesive agent makes it easy to paste various substrates. In addition, since a polyurethane resin serving as the base compound and a polyisocyanate-based curing agent react with each other to have a higher-molecular weight, it is possible to obtain a laminated body having superior durability, such as heat creep resistance. However, there is a problem that a pot life of an adhesive agent bath is short because of mixing of the base compound and the curing agent. Therefore, a large amount of labor for the management of the manufacturing environment, the adhesive agent bath, and the like is required.

On the other hand, as for the one-component adhesive agent, a pot life, as a two-component adhesive agent has, of an adhesive agent bath does not substantially exist. Accordingly, the management of the manufacturing environment, the adhesive agent bath, and the like is easy. However, there is a disadvantage that the open time is short. Furthermore, the open time is largely affected by the temperature of an adhesive-coated surface after drying, and tends to be short at a low temperature in a range approximately from 30 to 60° C. although it tends to be relatively long at a high temperature. Therefore, there is a problem that a large amount of labor for the management of the drying temperature and the temperature of an adhesive-coated surface is required for performing a stable paste operation.

Furthermore, containing dimethylformamide, toluene, methyl ethyl ketone, or the like as an organic solvent, many of such adhesive agents are highly flammable and highly toxic. Therefore, there is a problem regarding risk of fire, deterioration of the working environment, and environmental contaminations of the air, water, and the like. Note that a process for collecting such organic solvents has been implemented; however, there is a problem that substantial cost for disposal and a huge amount of work are required. Moreover, a laminated body obtained by use of an adhesive agent containing a resin dissolved in an organic solvent has a risk that the organic solvent remains in the laminated body. The effects on the human body, such as the sick-building syndrome, chemical sensitivity, and skin problems, which have come to be recognized in recent years, have been acknowledged as problems.

In order to solve these problems, investigation has been conducted for shifting from an adhesive agent containing a polyurethane resin dissolved in an organic solvent to an adhesive agent containing an aqueous polyurethane resin.

As for an aqueous polyurethane resin, examples are a dispersion substance in which a polyurethane resin is forced to disperse using a surfactant, and a polyurethane resin to which hydrophilicity is added by introducing a repeating unit of polyoxyethylene into a resin structure using polyether polyol, such as polyethylene glycol. The former, however, has a problem that the quality of the laminated body is lowered due to bleed of the surfactant with time, while the latter has a problem that the heat creep resistance and water resistance are insufficient.

Meanwhile, for example, the Japanese Unexamined Patent Application Publication No. Hei 6-313024 (Document 1) discloses a polyurethane resin, as a polyurethane resin having superior water solubility and water dispersivity, which is made of a lactone-based polyester polyol obtained by subjecting lactones to a ring-opening addition polymerization reaction with dihydroxycarboxylic acid as an initiator, an organic diisocyanate, and a chain extender, and which has a carboxylic group concentration of at least 10. However, since a carboxyl group is introduced to a soft segment, a polyurethane resin such as described in Document 1 is a resin having a low agglomerating property. Accordingly, in the case of being used as an adhesive agent, although the open time is slightly lengthened, the polyurethane resin is insufficient in terms of the adhesiveness at a low temperature in a range approximately from 30 to 60° C., and the durability, such as heat creep resistance and water resistance.

Meanwhile, the Japanese Unexamined Patent Application Publication No. Sho 64-69619 (Document 2) discloses a method for manufacturing an aqueous solution or a fluid dispersion of a polyisocyanate polyaddition product having groups selected from the group consisting of a carboxylate group and a sulfonate group and an ethylene oxide unit. However, in the case of using a polyisocyanate polyaddition product such as described in Document 2 as an adhesive agent, although the adhesiveness to a substrate is improved, there is a problem that stable manufacturing is difficult due to the short open time and insufficient adhesiveness at a low temperature in a range approximately from 30 to 60° C.

As described above, as for a conventional adhesive agent containing an aqueous polyurethane resin, the open time is short, the adhesiveness, especially adhesiveness at a low temperature in a range approximately from 30 to 60° C., has not reached a satisfactory level, and labor for the management of the drying temperature and the temperature of an adhesive-coated surface required for performing a stable paste operation is not reduced. In addition, a laminated body manufactured by using such an adhesive agent has a problem of being inferior to that obtained by using an adhesive agent containing an organic solvent-based polyurethane resin in terms of not only adhesive strength but also durability, such as heat-resistance creeping property.

DISCLOSURE OF THE INVENTION

The present invention has been made in consideration of the above-described problems in the conventional techniques. An object of the present invention is to provide an aqueous polyurethane resin composition either containing an organic solvent as little as possible or containing no organic solvent at all, the aqueous polyurethane resin composition having a long open time and adhesiveness, especially excellent adhesiveness even at a low temperature in a range approximately from 30 to 60° C., and making it possible to obtain a laminated body having excellent adhesion strength and heat creep resistance, to provide a one-component adhesive agent and a laminated body that use the same, and to provide a method for manufacturing the aqueous polyurethane resin composition.

The present inventor has earnestly studied in order to achieve the above object. As a result, the inventor has revealed that an aqueous polyurethane resin composition obtained by obtaining a neutralized prepolymer having a terminal isocyanate group by reacting a polyisocyanate and a polyfunctional compound containing a specific polyester polyol, and subjecting the neutralized prepolymer to a chain elongation reaction without dispersing the neutralized prepolymer into water with the use of a combination of polyamine having at least two groups selected from the group consisting of an amino group and an imino group and water, and then dispersing the elongated product into water has a long open time and shows superior adhesiveness. This discovery has led the inventor to complete the present invention.

The aqueous polyurethane resin composition of the present invention is obtained by:

obtaining a neutralized prepolymer having a terminal isocyanate group by reacting a polyisocyanate (A) and a polyfunctional compound (B) containing a polyester polyol ($B_1$) having an acidic group and at least one member selected from the group consisting of other polyols ($B_2$) and chain extenders ($B_3$) so as to satisfy a condition expressed by the following mathematical formula (1); and subjecting the neutralized prepolymer having a terminal isocyanate group to a chain elongation reaction with the use of a polyamine (C) containing at least two groups selected from the group consisting of an amino group and an imino group and water (D) so as to satisfy conditions expressed by the following mathematical formulas (2) and (3) to obtain a elongated product, and then dispersing the elongated product into water:

$$100/80 \leq a/b \leq 100/40 \tag{1}$$

$$100/98 \leq a/(b+c) \leq 100/80 \tag{2}$$

$$100/105 \leq a/(b+c+2d) \leq 100/95 \tag{3}$$

(in formulas (1) to (3), a represents the number of isocyanate groups (NCO) contained in the polyisocyanate (A), b represents the number of hydroxyl groups (OH) contained in the polyfunctional compound (B), c represents the number of amino groups ($NH_2$) and/or imino groups (NH) contained in the polyamine (C), and d represents the number of moles of the water (D)).

A method for manufacturing an aqueous polyurethane resin composition of the present invention is a method comprising the steps of:

obtaining a neutralized prepolymer having a terminal isocyanate group by reacting a polyisocyanate (A) and a polyfunctional compound (B) containing a polyester polyol ($B_1$) having an acidic group and at least one member selected from the group consisting of other polyols ($B_2$) and chain extenders ($B_3$) so as to satisfy a condition expressed by the following mathematical formula (1); and obtaining an aqueous polyurethane resin composition by subjecting the neutralized prepolymer having a terminal isocyanate group to a chain elongation reaction with the use of a polyamine (C) containing at least two groups selected from the group consisting of an amino group and an imino group and water (D) so as to satisfy conditions expressed by the following formulas (2) and (3) to obtain a elongated product, and then dispersing the elongated product into water:

$$100/80 \leq a/b \leq 100/40 \tag{1}$$

$$100/98 \leq a/(b+c) \leq 100/80 \tag{2}$$

$$100/105 \leq a/(b+c+2d) \leq 100/95 \tag{3}$$

(in formulas (1) to (3), a represents the number of isocyanate groups (NCO) contained in the polyisocyanate (A), b represents the number of hydroxyl groups (OH) contained in the polyfunctional compound (B), c represents the number of the groups selected from the group consisting of an amino group ($NH_2$) and an imino group (NH) contained in the polyamine (C), and d represents the number of moles of the water (D)). In the aqueous polyurethane resin composition of the present invention and the method for manufacturing the same, the neutralized prepolymer having a terminal isocyanate group is preferably obtained by reacting the polyisocyanate (A) and the polyfunctional compound (B) so as to satisfy a condition expressed by the following mathematical formula (4):

$$100/75 \leq a/b \leq 100/50 \tag{4}$$

(in the formula (4), a represents the number of isocyanate groups (NCO) contained in the polyisocyanate (A), and b represents the number of hydroxyl groups (OH) contained in the polyfunctional compound (B)).

Furthermore, in the aqueous polyurethane resin composition of the present invention and the method for manufacturing the same, it is preferable to subject the neutralized prepolymer having a terminal isocyanate group to a chain elongation reaction with the use of the polyamine (C) and the water (D) so as to satisfy conditions expressed by the following mathematical formulas (5) and (6):

$$100/95 \leq a/(b+c) \leq 100/85 \tag{5}$$

$$100/100 \leq a/(b+c+2d) \leq 100/98 \tag{6}$$

(in formulas (5) and (6), a represents the number of isocyanate groups (NCO) contained in the polyisocyanate (A), b represents the number of hydroxyl groups (OH) contained in the polyfunctional compound (B), c represents the number of the groups selected from the group consisting of an amino group ($NH_2$) and an imino group (NH) contained in the polyamine (C), and d represents the number of moles of the water (D)).

Furthermore, in the aqueous polyurethane resin composition of the present invention and the method for manufacturing the same, a content of acidic groups in a polyurethane resin in the aqueous polyurethane resin composition and anionic groups obtained by neutralizing the acidic groups is preferably in a range from 0.5 to 3.0% by mass relative to the mass of the polyurethane resin.

A one-component adhesive agent of the present invention comprises the aqueous polyurethane resin composition of the present invention.

Meanwhile, a laminated body of the present invention is obtained by using the one-component adhesive agent of the present invention.

According to the present invention, it is possible to provide an aqueous polyurethane resin composition either containing an organic solvent as little as possible or containing no organic solvent at all, the aqueous polyurethane resin composition having a long open time and adhesiveness, especially excellent adhesiveness even at a low temperature in a range approximately from 30 to 60° C., and making it possible to obtain a laminated body having excellent adhesion strength and heat creep resistance, and to provide a one-component adhesive agent, and a laminated body using the same.

Moreover, according to the aqueous polyurethane resin composition of the present invention, since it contains an organic solvent as little as possible or contains no organic solvent at all, it is possible to improve problems of air pollution and water contamination by an organic solvent, labor required for collecting organic solvent, and the like, and working environment, and further to implement measures for volatile organic compounds (VOC). Furthermore, as for the aqueous polyurethane resin composition of the present invention, since it can be used as a one-component adhesive agent not requiring an isocyanate-based curing agent, it is possible to solve a problem of a pot life observed in a two-component adhesive agent. In addition, having a property of a long open time, the aqueous resin composition of the present invention has excellent adhesiveness at a low temperature (approximately in a range from 30 to 60° C.) as well as at a high temperature (approximately in a range from 70 to 100° C.). Accordingly, it is possible to reduce labor for the management of the drying temperature, the temperature on an adhesive-coated surface, and the like for stable manufacturing. Accordingly, it is especially useful as an adhesive agent. Therefore, it is possible to obtain a laminated body having stable quality, especially in terms of adhesive strength and heat creep resistance (durability).

DETAILED DESCRIPTION OF THE PREFERRED EMBODIMENTS

Hereinafter, the present invention will be described in detail with reference to preferred embodiments.

Firstly, an aqueous polyurethane resin composition of the present invention and a method for manufacturing the same will be described. To be more specific, an aqueous polyurethane resin composition of the present invention is obtained by:

obtaining a neutralized prepolymer having a terminal isocyanate group by reacting a polyisocyanate (A) and a polyfunctional compound (B) containing a polyester polyol ($B_1$) having an acidic group and at least one member selected from the group consisting of other polyols ($B_2$) and chain extenders ($B_3$) so as to satisfy a condition expressed by the following mathematical formula (1); and subjecting the neutralized prepolymer having a terminal isocyanate group to a chain elongation reaction with the use of a polyamine (C) containing at least two groups selected from the group consisting of an amino group and an imino group and water (D) so as to satisfy conditions expressed by the following mathematical formulas (2) and (3) to obtain a elongated product, and then dispersing the elongated product into water:

$$100/80 \leq a/b \leq 100/40 \qquad (1)$$

$$100/98 \leq a/(b+c) \leq 100/80 \qquad (2)$$

$$100/105 \leq a/(b+c+2d) \leq 100/95 \qquad (3)$$

(in formulas (1) to (3), a represents the number of isocyanate groups (NCO) contained in the polyisocyanate (A), b represents the number of hydroxyl groups (OH) contained in the polyfunctional compound (B), c represents the number of the groups selected from the group consisting of an amino group ($NH_2$) and an imino group (NH) contained in the polyamine (C), and d represents the number of moles of the water (D)).

Meanwhile, a method for manufacturing an aqueous polyurethane resin composition of the present invention is a method including the steps of:

obtaining a neutralized prepolymer having a terminal isocyanate group by reacting a polyisocyanate (A) and a polyfunctional compound (B) containing a polyester polyol ($B_1$) having an acidic group and at least one member selected from the group consisting of other polyols ($B_2$) and chain extenders ($B_3$) so as to satisfy a condition expressed by the above-described mathematical formula (1); and obtaining an aqueous polyurethane resin composition by subjecting the neutralized prepolymer having a terminal isocyanate group to a chain elongation reaction with the use of polyamine (C) having at least two groups selected from the group consisting of an amino group and an imino group and water (D) so as to satisfy conditions expressed by the above-described formulas (2) and (3) to obtain a elongated product, and then dispersing the elongated product into water. As for the polyisocyanate (A) related to the present invention, it is not particularly limited, and an aromatic polyisocyanate, an aliphatic polyisocyanate, and an alicyclic polyisocyanate which have at least two isocyanate groups in one molecule can be used. As for such polyisocyanate (A), examples include aromatic polyisocyanates, such as tolylene diisocyanate, diphenylmethane diisocyanate, naphthalene diisocyanate, tolidine diisocyanate, xylylene diisocyanate, and tetramethyl xylylene diisocyanate; aliphatic polyisocyanates, such as hexamethylene diisocyanate, and trimethyl hexamethylene diisocyanate; and alicyclic polyisocyanates, such as isophorone diisocyanate, hydrogenated xylylene diisocyanate, dicyclohexylmethane diisocyanate, norbornane diisocyanate, and 1,3-bis(isocyanatomethyl)cyclohexane. Among these, from the viewpoint that an obtained polyurethane resin has resistance to yellowing, aliphatic polyisocyanates and alicyclic polyisocyanates are preferable, and hexamethylene diisocyanate, isophorone diisocyanate, dicyclohexylmethane diisocyanate, norbornane diisocyanate, and 1,3-bis(isocyanatomethyl)cyclohexane are especially preferable. Note that these polyisocyanates may be used as a single kind alone or as a combination of two or more kinds.

The polyfunctional compound (B) related to the present invention contains a polyester polyol ($B_1$) having an acidic group and at least one member selected from the group consisting of other polyols ($B_2$) and chain extenders ($B_3$).

As a polyester polyol ($B_1$) having an acidic group related to the present invention, a polyester polyol having a carboxyl group or a sulfonic acid group as an acidic group is preferable. Such a polyester polyol ($B_1$) can be obtained by a conventional publicly-known method, and, in the case of a polyester polyol having a carboxyl group, examples include: a method (i) in which lactones and dihydroxycarboxylic acid are subjected to ring-opening addition polymerization; and a method (ii) in which dihydroxycarboxylic acid and polycarboxylic acids are subjected to a condensation reaction by adding polyvalent alcohols if necessary.

Meanwhile, in the case of a polyester polyol having a sulfonic acid group, examples include: a method (i) in which lactones and dihydroxysulfonic acid are subjected to ring-opening addition polymerization; a method (ii) in which dihydroxysulfonic acid and polycarboxylic acids are subjected to a condensation reaction by adding polyvalent alcohols if necessary; a method (iii) in which dicarboxylic acid having a sulfonic acid group is subjected to an ester exchange reaction by use of polyvalent alcohols; and a method (iv) in which its ester exchange reaction product and lactones are subjected to ring-opening addition polymerization.

As for dihydroxycarboxylic acid used as a raw material for the polyester polyol ($B_1$), a publicly-known compound can be used accordingly. Examples thereof include 2,2-dimethylol propionic acid, 2,2-dimethylol butanoic acid, 2,2-dimethylol lactic acid, 2,2-dimethylol valeric acid, dioxymaleic acid, and 2,6-dioxybenzoic acid.

Furthermore, as for dihydroxysulfonic acid, a publicly-known compound can be used accordingly. Examples thereof include N,N-bis(2-hydroxyethyl)-2-aminoethyl sulfonic acid, 1,3-dimethylol-propanesulfonic acid, 1,3-dimethylol-butanesulfonic acid, 1,3-dimethylol-pentanesulfonic acid, 1-methylol-1-hydroxypropane sulfonic acid, 2,3-dihydroxybutane sulfonic acid, and salts (alkali metal salts, alkali earth metal salts, and the like) thereof.

In the meantime, as for dicarboxylic acid having a sulfonic acid group, it is not particularly limited, and examples thereof include 5-sulfoisophthalic acid, sulfoterephthalic acid, 4-sulfophthalic acid, 5-[4-sulphophenoxy]isophthalic acid, and the like, and salts (alkaline metal salts, alkaline earth metal salts) thereof.

Furthermore, as for lactones used in the ring-opening addition polymerization, a publicly-known compound can be used accordingly, and examples thereof include ε-caprolactone, γ-butyrolactone, and δ-valerolactone.

Meanwhile, as for polycarboxylic acids used in the condensation reaction, a publicly-known compound can be used accordingly. Examples thereof include aliphatic dicarboxylic acids, such as succinic acid, adipic acid, suberic acid, azelaic acid, sebacic acid, dimer acid, maleic acid, and fumaric acid, alicyclic dicarboxylic acids, such as 1,4-cyclohexane dicarboxylic acid and anhydrides and ester-forming derivatives thereof.

Furthermore, as for polyvalent alcohols which can be used for the condensation reaction and the ester exchange reaction, a publicly-known compound can be used accordingly. Examples thereof include aliphatic diols, such as ethylene glycol, propylene glycol, 1,3-propanediol, 1,4-butanediol, 1,6-hexanediol, neopentyl glycol, diethylene glycol, triethylene glycol, tetraethylene glycol, dipropylene glycol, tripropylene glycol, polyethylene glycol, 3-methyl-1,5-pentanediol; alicyclic diols, such as 1,4-cyclohexanediol and 1,4-cyclohexane dimethanol, and polyvalent (trivalent or more) alcohols, such as glycerin, trimethylolpropane, and pentaerythritol.

In the present invention, from the viewpoint that such a polyester polyol ($B_1$) having an acidic group decreases the hydrolizability of an obtained aqueous polyurethane resin composition, it is preferable to use a lactone-based polyester polyol in which lactones are subjected to ring-opening addition polymerization. Here, the number average molecular weight of the polyester polyol ($B_1$) is preferably in a range from 300 to 3,000, and is more preferably in a range from 500 to 2,000.

Other polyols ($B_2$) related to the present invention may be any polyol as long as it is different from the polyester polyol ($B_1$), and is not particularly limited. As for such other polyols ($B_2$), examples include polyester polyol, polycarbonate polyol, and polyether polyol.

Here, as for the polyester polyol, examples include polyethylene adipate diol, polybutylene adipate diol, polyethylene butylene adipate diol, polyhexamethylene isophthalate adipate diol, polyethylene succinate diol, polybutylene succinate diol, polyethylene sebacate diol, polybutylene sebacate diol, poly-ε-caprolactone diol, poly(3-methyl-1,5-pentylene)adipate diol, a polycondensation product of 1,6-hexane diol and dimer acid, a copolycondensation product of 1,6-hexane diol, adipic acid, and dimmer acid, a polycondensation product of nonanediol and dimmer acid, and a copolycondensation product of ethylene glycol and adipic acid.

Here, as for such a polycarbonate polyol, examples include polytetramethylene carbonate diol, polyhexamethylene carbonate diol, and poly-1,4-cyclohexane dimethylene carbonate diol.

Here, as for the polyether polyol, examples include a homopolymer, a block copolymer, and a random copolymer of polyethylene glycol, polypropylene glycol, and polytetramethylene glycol, and a random copolymer and a block copolymer of ethylene oxide and propylene oxide, and ethylene oxide and butylene oxide. Furthermore, as the polyether polyol, polyether ester polyol and the like having an ether bond and an ester bond may be used.

Note that these other polyols ($B_2$) may be used as a single kind alone or as a combination of two or more kinds. In addition, the number average molecular weights of the another polyols ($B_2$) are preferably in a range from 500 to 5,000.

As for the chain extenders ($B_3$) related to the present invention, an example includes a compound having at least two hydrogen atoms which can react with an isocyanate group. Here, as for such chain extenders ($B_3$), it is preferable to use one having a molecular weight of 300 or less. As for such chain extenders ($B_3$), examples include: low-molecular weight polyvalent alcohols, such as ethylene glycol, propylene glycol, neopentyl glycol, 1,4-butanediol, 1,6-hexanediol, trimethylolpropane, pentaerythritol, and sorbitol; and low-molecular weight polyamines, such as ethylene diamine, propylene diamine, hexamethylene diamine, diaminocyclohexyl methane, piperazine, 2-methylpiperazine, isophorondiamine, diethylene triamine, and triethylene tetramine. These chain extenders ($B_3$) may be used as a single kind alone or as a combination of two or more kinds.

Furthermore, as such chain extenders ($B_3$), compounds having an acidic group (carboxyl group or sulfonic acid group), such as dihydroxycarboxylic acid, dihydroxysulfonic acid, 3,4-diaminobutanesulfonic acid, 3,6-diamino-2-toluenesulfonic acid, 2,4-diaminobenzenesulfonic acid, N-(2-aminoethyl)-2-aminoethylsulfonic acid, and salts thereof, which have been exemplified above as a raw material for the polyester polyol ($B_1$), can be used within a range where the adhesiveness and open time of an obtained aqueous polyurethane resin compound are not affected.

The polyamine (C) related to the present invention is one having at least two groups selected from the group consisting of an amino group and an imino group. As for such a polyamine (C), it is not particularly limited, and examples thereof include: diamines, such as ethylene diamine, propylene diamine, tetramethylene diamine, hexamethylene diamine, diamino cyclohexyl methane, piperazine, hydrazine, 2-methylpiperazine, isophorone diamine, norbornane diamine, diamino diphenylmethane, tolylenediamine, and xylylenediamine; polyamines, such as diethylene triamine, triethylene tetramine, tetraethylene pentamine, iminobispropylamine, and tris(2-aminoethyl)amine; amidoamines derived from a di primary amine and a monocarboxylic acid; water-soluble amine derivatives, such as a monoketimine of a di primary amine; and hydrazine derivatives, such as oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, itaconic acid dihydrazide, 1,1'-ethylene hydrazine, 1,1'-trimethylene hydrazine, and 1,1'-(1,4-butylene)dihydrazine. These polyamines (C) may be used as a single kind alone or as a combination of two or more kinds.

By using the above-described polyisocyanate (A), polyfunctional compound (B), and polyamine (C), an aqueous polyurethane resin composition of the present invention can be obtained. To be more specific, the aqueous polyurethane resin composition of the present invention is obtained by obtaining a neutralized prepolymer having a terminal isocyanate group by reacting the polyisocyanate (A) and the polyfunctional compound (B) so as to satisfy a specific condition, and subjecting the neutralized prepolymer having the terminal isocyanate group to a chain elongation reaction with the use of the polyamine (C) and water (D) so as to satisfy a specific condition and then dispersing the elongated product into water.

In order to manufacture the aqueous polyurethane resin composition of the present invention, firstly, a neutralized prepolymer having a terminal isocyanate group is obtained by reacting the polyisocyanate (A) and the polyfunctional compound (B) with each other so as to satisfy the condition expressed by the following mathematical formula (1):

$$100/80 \leq a/b \leq 100/40 \quad (1)$$

If the value of a/b falls below 100/80, the agglomerating property of an obtained polyurethane is low. Accordingly, when it is used as an adhesive agent, the heat creep resistance is lowered. On the other hand, if the value exceeds 100/40, the agglomerating property of an obtained polyurethane resin is high. Accordingly, when it is used as an adhesive agent, the open time is short, and, furthermore, the adhesiveness at a low temperature is lowered. Here, in the above mathematical formula (1), a represents the number of isocyanate groups (NCO) contained in the polyisocyanate (A), and b represents the number of hydroxyl groups (OH) contained in the polyfunctional compound (B).

Furthermore, in the present invention, from the viewpoint of the balance in the agglomerating property of an obtained polyurethane resin, the value of a/b is preferably 100/75 or above and 100/50 or below, and more preferably 100/70 or above and 100/60 or below.

Here, the neutralized prepolymer having a terminal isocyanate group related to the present invention is an anionic group (for example, a carboxylate group ($-COO^-$)) obtained by neutralizing an acidic group, which is, to be more specific, an acidic group (for example, carboxyl group) derived from the above-described polyester polyol ($B_1$) or the above-described chain extenders ($B_3$) having the acidic group, in the polyfunctional compound (B) to be subjected to a reaction with the polyisocyanate (A). Note that this neutralization reaction may be performed before, during, or after the manufacturing of the prepolymer.

Furthermore, as for a neutralizer used for the neutralization reaction, it is not particularly limited. Examples thereof include: non-volatile bases, such as sodium hydroxide and potassium hydroxide; tertiary amines, such as trimethylamine, triethylamine, dimethylethanolamine, diisopropylaminoethanol, and triethanolamine; and volatile bases, such as ammonia. These may be used as a single kind alone or as a combination of two or more kinds. Here, as such a neutralizer, a volatile base is especially preferable.

As for a method for reacting the polyisocyanate (A) and the polyfunctional compound (B) with each other, it is not particularly limited. For example, a publicly-known one-stage method, so-called one-shot method, and a multi-stage isocyanate polyaddition reaction method may be adopted. The reaction temperature of the reaction is preferable in a range from 40 to 150° C. In addition, when this reaction is carried out, a reaction catalyst, such as dibutyltin dilaurate, stannous octoate, dibutyltin-2-ethylhexanoate, triethylamine, triethylene diamine, and N-methylmorpholine, may be added if necessary. Here, the reaction may be performed with the use of no solvent, and an organic solvent which does not react with an isocyanate group may be added during the reaction or after the termination of the reaction. As for the organic solvent, for example, acetone, methyl ethyl ketone, toluene, tetrahydrofuran, dioxane, dimethylformamide, and N-methylpyrrolidone may be used.

In order to manufacture the aqueous polyurethane resin composition of the present invention, secondly, the neutralized prepolymer having a terminal isocyanate group obtained as described above is subjected to a chain elongation reaction with the use of the polyamine (C) and water (D) so as to satisfy conditions expressed by the following mathematical formulas (2) and (3):

$$100/98 \leq a/(b+c) \leq 100/80 \quad (2)$$

$$100/105 \leq a/(b+c+2d) \leq 100/95 \quad (3),$$

and then dispersing the elongated product into water. Here, in the above mathematical formulas (2) and (3), a represents the number of isocyanate groups (NCO) contained in the polyisocyanate (A), b represents the number of hydroxyl groups (OH) contained in the polyfunctional compound (B), c represents the number of groups selected from the group consisting of an amino group ($NH_2$) and an imino group (NH) contained in the polyamine (C), and d represents the number of moles of the water (D).

For the aqueous polyurethane resin composition of the present invention, it is important that the neutralized prepolymer having a terminal isocyanate group is subjected to a chain elongation reaction with the use of a combination of the polyamine (C) and the water (D) as a chain extender and then dispersing the elongated product into water after the chain elongation reaction. By carrying out these processes, the open time is extended, and the adhesiveness is improved. Accordingly, the durability, such as heat creep resistance, of an obtained laminated body is improved.

In other words, if the chain elongation reaction is carried out with the use of only the polyamine (C), the viscosity of the reactant is instantly increased, and then the reactant is eventually solidified. Accordingly, it is difficult to use such a reactant as an aqueous adhesive agent. Meanwhile, if the chain elongation reaction is carried out with the use of only the water (D), although the viscosity in the reaction system would not be too high, the agglomerating property of an obtained aqueous polyurethane resin composition is lowered, resulting in significantly inferior achieved durability, such as heat creep resistance. Furthermore, if the neutralized prepolymer having a terminal isocyanate group is firstly dispersed into water (emulsification dispersion) and then subjected to a chain elongation reaction, the free isocyanate group of the neutralized prepolymer having a terminal isocyanate group disappears because it reacts with water serving as a solvent during emulsification dispersion process. Accordingly, a chain elongation reaction cannot be carried out efficiently. Therefore, the durability, such as heat creep resistance, of an obtained laminated body ends up being insufficient. In the meantime, if the disappearance of the free isocyanate group is significant during dispersion process into water, the amino group and/or imino group contained in the polyamine (C) may remain in the system without being reacted sufficiently. Accordingly, there arise problems of heat discoloration and light discoloration of a coating film.

Furthermore, for the aqueous polyurethane resin composition of the present invention, it is necessary that the neutralized prepolymer having a terminal isocyanate group is subjected to a chain elongation reaction so as to satisfy the condition expressed by the mathematical formula (2). If the value of the a/(b+c) falls below 100/98, the agglomerating property of the polyurethane resin is increased because the number of chain elongation reaction sites with water decreases. Accordingly, the open time is shortened. In addition, because the bond (urea bond) with the amino group and/or imino group is increased, the viscosity of the aqueous polyurethane resin composition is increased. Accordingly, there is a possibility that the following water dispersion is insufficient. On the other hand, if the value of the a/(b+c) exceeds 100/80, the agglomerating property of an obtained polyurethane resin is lowered because the number of chain elongation reaction sites with water increases. Accordingly, the adhesiveness is insufficient, and, as a result, the heat creep resistance of an obtained laminated body is insufficient. Furthermore, in the present invention, from the viewpoint of the balance between the open time and the adhesiveness in the case of using the aqueous polyurethane resin composition as an adhesive agent, the value of the a/(b+c) is preferably 100/95 or above and 100/85 or below, and more preferably 100/90 or above and 100/85 or below.

Moreover, for the aqueous polyurethane resin composition of the present invention, it is necessary that the neutralized prepolymer having a terminal isocyanate group is subjected to a chain elongation reaction so as to satisfy the condition expressed by the above mathematical formula (3). If the value of the a/ (b+c+2d) falls below 100/105, the agglomerating property of an obtained polyurethane resin is lowered since the number of chain elongation reaction sites with water increases. Accordingly, the adhesiveness is insufficient, and the heat creep resistance of an obtained laminated body is insufficient. On the other hand, if the value exceeds 100/95, the free isocyanate group in the neutralized prepolymer having a terminal isocyanate group remains, and the chain elongation reaction cannot be carried out efficiently. As a result, the durability, such as heat creep resistance, of an obtained laminated body is insufficient. Furthermore, in the present invention, from the viewpoint of the balance between the adhesiveness in the case of being used as an adhesive agent and the heat creep resistance of an obtained laminated body, the value of the a/(b+c+2d) is preferably 100/100 or above and 100/98 or below, and more preferably 100/100 or above and 100/99 or below.

As for a method for subjecting the neutralized prepolymer having a terminal isocyanate group to a chain elongation reaction, it is not particularly limited. For example, (i) a method in which the neutralized prepolymer having a terminal isocyanate group is subjected to a chain elongation reaction with the use of the polyamine (C) and then to a chain elongation reaction with the use of the water (D); (ii) a method in which the neutralized prepolymer having a terminal isocyanate group is subjected to a chain elongation reaction with the use of the water (D) and then to a chain elongation reaction with the use of the polyamine (C); and (iii) a method for subjecting the neutralized prepolymer having a terminal isocyanate group to a chain elongation reaction with the use of the polyamine (C) and the water (D) at the same time may be adopted.

The reaction temperature in such a chain elongation reaction is preferably in a range from 30 to 100° C., and more preferably in a range from 40 to 60° C. If the reaction temperature falls below 30° C., the chain elongation reaction between the isocyanate group and the water is insufficient, and there is a possibility that the molecular weight is not increased. Accordingly, the durability, such as heat creep resistance and water resistance, tends to be insufficient. On the other hand, if the reaction temperature exceeds 100° C., there is a possibility that the water (D) serving as a chain extender evaporates, resulting in the insufficient chain elongation by water. As a result, the durability, such as heat creep resistance and water resistance, of an obtained laminated body tends to be insufficient.

Furthermore, the chain elongation reaction can be carried out without involving a solvent, and an organic solvent which does not react with an isocyanate group may be added during the chain elongation reaction or after the termination of the reaction. As such an organic solvent, for example, acetone, methyl ethyl ketone, toluene, tetrahydrofuran, dioxane, dimethylformamide, and N-methylpyrrolidone can be used.

Furthermore, such a chain elongation reaction is preferably carried out until the free isocyanate group in the neutralized prepolymer having a terminal isocyanate group is 0.3% by mass or below with respect to the polyurethane resin, and more preferably carried out until it is 0.2% by mass or below. If more than 0.3% by mass of the free isocyanate group is left, the adhesiveness is insufficient because a sufficiently high molecular weight cannot be achieved in the chain elongation reaction. Accordingly, the durability, such as heat creep resistance and water resistance, of an obtained laminated body tends to be insufficient.

As for a method for dispersing the elongated product having a terminal isocyanate group into water after the elongation reaction, it is not particularly limited. However, a method of dispersion using a homomixer, a homogenizer, or the like, can be adopted.

Meanwhile, if an organic solvent is used in the manufacturing of the aqueous polyurethane resin composition of the present invention, it is preferable that the organic solvent is removed by a method, such as reduced-pressure distillation, after the dispersion into water. When an organic solvent is removed, in order to maintain the emulsified form, a surfactant, such as: anionic surfactants including higher fatty acid salts, resin acid salts, long-chain fatty alcohol sulfonic acid salts, higher alkyl sulfonic acid salts, alkyl aryl sulfonic acid salts, sulfonated castor oil, sulfosuccinate esters, and the like; and nonionic surfactants including reaction products of ethylene oxide and long-chain fatty alcohols or phenols and the like may be used if necessary.

The aqueous polyurethane resin composition of the present invention contains an organic solvent as little as possible or contains no organic solvent at all. Therefore, even if the aqueous polyurethane resin composition of the present contains an organic solvent, the content percentage of an organic solvent in the aqueous polyurethane resin composition of the present invention is preferably 0.5% by mass or below with respect to the mass of the aqueous polyurethane resin composition, and more preferably 0.1% by mass or below.

In the aqueous polyurethane resin composition of the present invention, the content of acidic groups in a polyurethane resin in an obtained aqueous polyurethane resin composition and anionic groups obtained by neutralizing the acidic groups is preferably in a range from 0.5 to 3.0% by mass, and more preferably in a range from 1.0 to 2.0% by mass with respect to the mass of the polyurethane resin. If the content falls below 0.5% by mass, there is a possibility that water dispersion is insufficient; therefore, there is a possibility of an influence on the quality stability. On the other hand, if the content exceeds 3.0% by mass, there is a possibility that the open time of an obtained aqueous polyurethane resin composition is shortened, and the adhesiveness at a low temperature and water resistance tend to be lowered.

The aqueous polyurethane resin composition of the present invention obtained as described above can be preferably used in various applications for adhesive agents, tackiness agents, primer coating agents, anchor coating agents, synthetic leather, and the like, and can be especially preferably used as a one-component adhesive agent for manufacturing a laminated body.

In addition, while the aqueous polyurethane resin composition of the present invention can be directly used for various applications, such as one-component adhesive agents, publicly-known additive components conventionally used as listed below may be used if necessary within a range where the effect of the present invention is not affected.

For example, in order to improve the durability of an obtained adhesive layer, a publicly-known cross-linking agent may be used in combination if necessary. As for such a cross-linking agent, examples include water-soluble epoxy-based cross-linking agents, water dispersion-type carbodiimide-based cross-linking agents, water-soluble oxazoline-based cross-linking agents, and water dispersion-type isocyanate-based cross-linking agents. Among these, from the viewpoint of improving heat-resistance creeping property and water resistance, water dispersion-type carbodiimide-based cross-linking agents and water dispersion-type isocyanate-based cross-linking agents are preferable.

Meanwhile, in order to improve processing suitability and adhesiveness of a one-component adhesive agent, if necessary, a thickener, such as an associated-type thickener and a polycarboxylic acid-based thickener; various surfactants, such as fluorine-based and acetylene glycol-based surfactants; a solvent-shedding inhibitor, such as n-methyl pyrrolidone, and propylene glycol monomethyl ether acetate; a tackifying agent, such as a rosin resin, a rosin ester resin, a terpene resin, a terpene phenol resin, and a coumarone resin; various stabilizers, such as an antioxidant, a light-resistant stabilizer, and an ultraviolet absorber; an antifoamer and a plasticizer which are mineral oil-based, silicone-based, and the like; and a coloring agent, such as a pigment, may be used in combination.

Furthermore, within a range where the effect of the present invention is not deteriorated, other water dispersions, for example, emulsions which are vinyl acetate-based, ethylene vinyl acetate-based, acryl-based, acryl styrene-based, and the like; latexes which are styrene-butadiene-based, acrylonitrile-butadiene-based, acryl-butadiene-based, and the like; ionomers which are polyethylene-based, polyolefin-based, and the like; and polyurethane, polyester, polyamide, epoxy-based resins and the like may be used in combination.

Next, a one-component adhesive agent and a laminated body of the present invention will be described. To be more specific, a one-component adhesive agent of the present invention contains the above-described aqueous polyurethane resin composition of the present invention. Meanwhile, a laminated body of the present invention having excellent durability, such as adhesion strength and heat creep resistance, can be manufactured by pasting various substrates with the use of the one-component adhesive agent of the present invention.

The one-component adhesive agent of the present invention may be composed of only the above-described aqueous polyurethane resin composition of the present invention, or may contain the above-described publicly-known additive components conventionally used if necessary. If such an additive component is contained, the content of the aqueous polyurethane resin composition is preferably approximately 90% by mass or above with respect to the mass of the one-component adhesive agent, and more preferably approximately in a range from 90 to 99% by mass.

As for a type of the laminated body of the present invention, it is not particularly limited, and for example, a plate-shaped laminated body, a sheet-shaped laminated body, and a leather-shaped laminated body can be provided. Meanwhile, as for a substrate of the laminated body, it is not particularly limited, and examples include: substrates having thickness, such as metal, wood, and glass; film-shaped substrates, such as plastic films made of polyvinyl chloride and polyolefin, metal foils, paper, metal foils and paper coated with a plastic film, plastic films vapor-deposited with aluminum and silica; and substrates for a leather-shaped laminated body, such as resin layers made of publicly-known synthetic leather materials including a polyurethane resin and the like, various woven fabrics, knitted fabrics, and nonwoven fabrics.

Furthermore, the one-component adhesive agent of the present invention can be used by applying to at least one of substrates to be pasted with each other, and the amount of application is preferably an amount in a range from 10 to 300 $g/m^2$ in terms of mass per unit area of the polyurethane resin, and more preferably in a range from 50 to 150 $g/m^2$. If the amount of application falls below 10 $g/m^2$, there is a possibility that the adhesion strength of an obtained laminated body is weakened. On the other hand, if the amount exceeds 300 $g/m^2$, a drying time of the adhesive agent (time for water to evaporate) is lengthened; therefore, it is not financially preferable. As for a method for coating such a one-component adhesive agent, a publicly-known method can be adopted accordingly, and examples include: coating methods, such as roll coating, gravure coating, knife coating, reverse coating, and kiss coating; and methods using a spray, a brush and the like.

As for a method for pasting substrates using the one-component adhesive agent of the present invention, it is not particularly limited, and any one of a wet laminating method and a dry laminating method can be adopted. However, from the viewpoint of the quality, adhesion strength, and durability of an obtained laminated body, a dry laminating method is preferable.

In the wet laminating method, an adhesive agent is applied on a substrate, and then another substrate is pasted thereto. In the meantime, in the dry laminating method, after an adhesive agent is applied to a substrate, the substrate is dried and then another substrate is pasted thereto. Conditions for the drying are not particularly limited; however, it is preferable that a substrate is dried, for example, at a temperature in a range from 30 to 150° C. for 20 minutes or less by use of a publicly-known drier, such as a hot-air drier, an infrared-radiation drier, a microwave-radiation drier, and a wet-heat drier.

In addition, when substrates are pasted with each other, thermocompression bonding may be performed if necessary.

Conditions for the thermocompression bonding are preferably set to: a thermocompression temperature in a range from room temperature to 150° C., a thermocompression time of 20 minutes or shorter, and a thermocompression pressure in a range from 0.1 to 400 kg/cm². Here, when substrates are pasted with each other, the substrates may be pasted while being subjected to thermocompression bonding, or may be subjected to thermocompression bonding after being pasted with each other.

The laminated body of the present invention obtained as described above is applied to various applications, such as interior materials of vehicles, such as cars, articles for daily use, such as shoes and wallets, synthetic leathers used in furniture, such as chairs, and fiber products, such as clothing, building materials, vacuum-molded articles, and packaging materials.

EXAMPLES

Hereinafter, the present invention will be described in more detail on the basis of Examples and Comparative Examples. However, the present invention is not limited to the following Examples. Here, the open time, adhesiveness, normal-state adhesiveness, and heat creep resistance of an adhesive agent were evaluated or measured by the following methods, respectively.

(i) Open Time of an Adhesive Agent

An adhesive agent was applied to a soft polyvinyl chloride film (Takafuji Co., Ltd, "TAFUNYL SG482-2," 50 mm in width×100 mm in length×2 mm in thickness) by use of a brush so as to achieve the mass of polyurethane resin per unit area of 100 g/m², and dried at 60° C. for 5 minutes in a hot-air drier to obtain a test piece. After the drying, the test piece was immediately left at 20° C. at rest, and the adhesive-applied layer of the test piece was pasted to an adhesive-applied layer of another test piece at intervals of 5 minutes, and the test pieces were subjected to compression under a condition of 30° C. and 40 N/cm² for 10 seconds in a heat pressing machine. A period of time until the test pieces did not attach with each other was measured. A longer period of time after the drying until the test pieces do not attach with each other indicates a longer open time.

(ii) Adhesiveness

An adhesive agent was applied to a soft polyvinyl chloride film (Takafuji Co., Ltd, "TAFUNYL SG482-2," 50 mm in width×100 mm in length×2 mm in thickness) by use of a brush so as to achieve the mass of polyurethane resin per unit area of 100 g/m², and dried at 60° C. for 5 minutes in a hot-air drier. Immediately after the drying, adhesive-applied layers were pasted to each other, and subjected to compression at a temperature of 30, 50, 70, or 100° C. under a pressure condition of 40 N/cm² for 10 seconds in a heat pressing machine to obtain a laminated body.

The obtained laminated body was adjusted to a size of 20 mm in width×100 mm in length, and the 180-degree peeling strength thereof was measured at a tensile rate of 100 mm/minute using AUTOGRAPH (AG-IS, made by Shimadzu Corporation).

A higher peeling strength indicates superior adhesiveness. Especially, when the peeling strength of a laminated body obtained at a low temperature in heat press is high, the adhesiveness at a low temperature is superior in low temperature adhesiveness.

(iii) Normal-State Adhesiveness

An adhesive agent was applied to a soft polyvinyl chloride film (Takafuji Co., Ltd, "TAFUNYL SG482-2," 50 mm in width×100 mm in length×2 mm in thickness) by use of a brush so as to achieve the mass of polyurethane resin per unit area of 100 g/m², and dried at 60° C. for 5 minutes in a hot-air drier. Immediately after the drying, adhesive-applied layers were pasted to each other, subjected to compression at a temperature of 60° C. under a pressure condition of 40 N/cm² for 10 seconds in a heat pressing machine, and then cured at a temperature of 20° C. at a humidity of 65% RH to obtain a laminated body.

The obtained laminated body was adjusted to a size of 20 mm in width×100 mm in length, and the 180-degree peeling strength thereof was measured at a tensile rate of 100 mm/minute using AUTOGRAPH (AG-IS, made by Shimadzu Corporation).

(iv) Heat Creep Resistance

Evaluation was carried out according to a method described in a peeling test piece in JIS K 6833 (1994) 8.2.2. To be more specific, an adhesive agent was applied to a soft polyvinyl chloride film (Takafuji Co., Ltd, "TAFUNYL SG482-2") by use of a brush so as to achieve the mass of polyurethane resin per unit area of 100 g/m², and dried at 60° C. for 5 minutes in a hot-air drier. Immediately after the drying, adhesive-applied layers were pasted to each other, subjected to compression at a temperature of 60° C. under a pressure condition of 40 N/cm² for 10 seconds in a heat pressing machine, and then cured at a temperature of 20° C. at a humidity of 65% RH to obtain a laminated body.

The obtained laminated body was cut out in a size of 20 mm in width×150 mm in length, and placed in a hot-air drier in a 70° C. atmosphere with a weight loading 1 kg. After 30 minutes, a state of peeling of the laminated body was determined according to the following criteria.
A: The distance of peeling is within 10 mm
B: The distance of peeling is in a range from 11 to 50 mm
C: The distance of peeling is 51 mm or above Preparation Example 1

In a four-necked flask provided with a stirrer, a reflux condenser tube, a thermometer, and a nitrogen inlet tube, under a stream of nitrogen gas, 148 g of 2,2-dimethylolbutanoic acid, 852 g of ε-caprolactone, and 0.02 g of dibutyltin oxide which serves as a catalyst were placed, and reacted at a reaction temperature of 160° C. for approximately 7 hours to obtain a lactone-based polyester polyol having a carboxyl group. The obtained polyester polyol had a hydroxyl value of 112.2 mgKOH/g and an acid value of 55.7 mgKOH/g.

Preparation Example 2

In a four-necked flask provided with a stirrer, a reflux condenser tube, a thermometer, and a nitrogen inlet tube, under a stream of nitrogen gas, 302 g of 5-sulfosodium isophthalic acid dimethyl ester, 180 g of 1,4-butanediol, and 0.02 g of dibutyltin oxide which serves as a catalyst were placed, and an ester exchange reaction was carried out for approximately 4 hours at a reaction temperature in a range from 190 to 200° C. to achieve an acidic value of 1 mgKOH/g or below. Next, after the flask was cooled down to 100° C., 518 g of ε-caprolactone was placed therein, and subjected to a reaction at a reaction temperature of 160° C. for approximately 8 hours to obtain a lactone-based polyester polyol having a sulfonic acid group. The obtained polyester polyol had a hydroxyl value of 104.5 mgKOH/g and an acid value of 0.5 mgKOH/g.

<Preparation of a Polyurethane Resin Composition>

Example 1

In a four-necked flask provided with a stirrer, a reflux condenser tube, a thermometer, and a nitrogen inlet tube, under a stream of nitrogen gas, 170.5 g of polybutylene adipate diol (number average molecular weight: 2000), 102.3 g of the polyester polyol having a carboxyl group obtained in Preparation Example 1, 1.5 g of 1,4-butanediol, and 87.5 g of acetone were added and mixed uniformly. Thereafter, 75.7 g of isophorone diisocyanate was added thereto, and then 0.5 g of dibutyltin dilaurate was added thereto. Then, after the temperature was raised to 70° C., a reaction was carried out for approximately 3 hours, and then an acetone solution of an isocyanate group terminated prepolymer having 2.6% by mass of free isocyanate groups relative to a nonvolatile fraction was obtained. Here, the value of a/b in the prepolymer manufacturing was 100/60.

After the obtained acetone solution of prepolymer was cooled down to 30° C., and neutralized by adding 10.3 g of triethylamine, 62.5 g of acetone, 6.1 g of ethylene diamine, and 0.6 g of ion-exchange water were added thereto, a chain elongation reaction was carried out for approximately 1 hour at 40 to 50° C. until a free isocyanate group content of 0.2% by mass or less was achieved, and then an acetone solution of polyurethane resin was obtained. Here, the value of a/(b+c) in the chain elongation reaction was 100/90, and the value of a/(b+c+2d) was 100/100.

Next, 534.8 g of ion-exchange water was gradually added to the obtained acetone solution of polyurethane resin so as to achieve emulsification dispersion of the polyurethane resin. After the temperature was raised to 40° C. under a reduced pressure, solvent removal was carried out for approximately 3 hours, and an aqueous polyurethane resin composition having a solid content of 40% by mass was obtained. In the obtained composition, the content of carboxyl groups and carboxylate groups in the polyurethane resin was 1.3% by mass. Furthermore, the obtained composition was an extremely stable emulsion exhibiting no separation and sedimentation with time.

Example 2

In a four-necked flask provided with a stirrer, a reflux condenser tube, a thermometer, and a nitrogen inlet tube, under a stream of nitrogen gas, 238.0 g of polybutylene adipate diol (number average molecular weight: 2000), 44.62 g of the polyester polyol having a sulfonic acid group obtained in Preparation Example 2, 1.3 g of 1,4-butanediol, and 87.5 g of acetone were added and mixed uniformly. Thereafter, 66.0 g of isophorone diisocyanate was added thereto, and then 0.5 g of dibutyltin dilaurate was added thereto. Then, after the temperature was raised to 70° C., a reaction was carried out for approximately 4 hours, and then an acetone solution of an isocyanate group terminated prepolymer having 2.3% by mass of free isocyanate groups relative to a nonvolatile fraction was obtained. Here, the value of a/b in the prepolymer manufacturing was 100/60.

After the obtained acetone solution of prepolymer was cooled down to 30° C., 62.5 g of acetone, 5.4 g of ethylene diamine, and 0.5 g of ion-exchange water were added thereto. Then, a chain elongation reaction was carried out for approximately 1 hour at 40 to 50° C. until a free isocyanate group content of 0.2% by mass or less was achieved, and then an acetone solution of polyurethane resin was obtained. Here, in the chain elongation reaction, the value of a/(b+c) was 100/90, and the value of a/(b+c+2d) was 100/100.

Next, 532.5 g of ion-exchange water was gradually added to the obtained acetone solution of polyurethane resin so as to achieve emulsification dispersion of the polyurethane resin. After the temperature was raised to 40° C. under a reduced pressure, solvent removal was carried out for approximately 3 hours, and an aqueous polyurethane resin composition having a solid content of 40% by mass was obtained. In the obtained composition, the content of sulfonic acid group and sulfonate group in the polyurethane resin was 1.3% by mass. Furthermore, the obtained composition was an extremely stable emulsion exhibiting no separation and sedimentation with time.

Example 3

In a four-necked flask provided with a stirrer, a reflux condenser tube, a thermometer, and a nitrogen inlet tube, under a stream of nitrogen gas, 194.0 g of polybutylene adipate diol (number average molecular weight: 2000), 88.2 g of the polyester polyol having a carboxyl group obtained in Preparation Example 1, 0.5 g of 1,4-butanediol, 2.0 g of 2,2-dimethylol propionic acid, and 87.5 g of acetone were added and mixed uniformly. Thereafter, 65.3 g of isophorone diisocyanate was added thereto, and then 0.5 g of dibutyltin dilaurate was added thereto. Then, after the temperature was raised to 70° C., a reaction was carried out for approximately 5 hours, and then an acetone solution of an isocyanate group terminated prepolymer having 1.7% by mass of free isocyanate groups relative to a nonvolatile fraction was obtained. Here, the value of a/b in the prepolymer manufacturing was 100/70.

After the obtained acetone solution of prepolymer was cooled down to 30° C., and neutralized by adding 10.4 g of triethylamine, 62.5 g of acetone and 2.7 g of ethylene diamine were added thereto, and a chain elongation reaction was carried out for approximately 30 minutes at 40 to 50° C. Thereafter, 0.8 g of ion-exchange water was added thereto, a chain elongation reaction was carried out for approximately 1 hour at 40 to 50° C. until a free isocyanate group content of 0.2% by mass or less was achieved, and then an acetone solution of polyurethane resin was obtained. Here, the value of a/(b+c) in the chain elongation reaction was 100/85, and the value of a/(b+c+2d) was 100/100.

Next, 534.8 g of ion-exchange water was gradually added to the obtained acetone solution of polyurethane resin so as to achieve emulsification dispersion of the polyurethane resin. After the temperature was raised to 40° C. under a reduced pressure, solvent removal was carried out for approximately 3 hours, and an aqueous polyurethane resin composition having a solid content of 40% by mass was obtained. In the obtained composition, the content of carboxyl groups and carboxylate groups in the polyurethane resin was 1.3% by mass. Furthermore, the obtained composition was an extremely stable emulsion exhibiting no separation and sedimentation with time.

Example 4

In a four-necked flask provided with a stirrer, a reflux condenser tube, a thermometer, and a nitrogen inlet tube, under a stream of nitrogen gas, 194.0 g of polybutylene adipate diol (number average molecular weight: 2000), 88.2 g of the polyester polyol having a carboxyl group obtained in Preparation Example 1, 0.5 g of 1,4-butanediol, 2.0 g of 2,2-diemethylol propionic acid, and 87.5 g of acetone were added and mixed uniformly. Thereafter, 65.3 g of isophorone diisocyanate was added thereto, and then 0.5 g of dibutyltin dilaurate was added thereto. Then, after the temperature was raised to 70° C., a reaction was carried out for approximately 5 hours, and then an acetone solution of an isocyanate group terminated prepolymer having 1.7% by mass of free isocyanate groups relative to a nonvolatile fraction was obtained. Here, the value of a/b in the prepolymer manufacturing was 100/70.

The obtained acetone solution of prepolymer was cooled down to 30° C., and neutralized by adding 10.4 g of triethylamine. Then, 0.8 g of ion-exchange water was added thereto, and a chain elongation reaction was carried out at 40 to 50° C. for approximately 1 hour. Thereafter, 62.5 g of acetone and 2.7 g of ethylene diamine were added thereto. Then, a chain elongation reaction was carried out for approximately 30 minutes at 40 to 50° C. until a free isocyanate group content of 0.2% by mass or less was achieved, and an acetone solution of polyurethane resin was obtained. Here, the value of a/(b+c) in the chain elongation reaction was 100/85, and the value of a/(b+c+2d) was 100/100.

Next, 543.8 g of ion-exchange water was gradually added to the obtained acetone solution of polyurethane resin so as to achieve emulsification dispersion of the polyurethane resin. After the temperature was raised to 40° C. under a reduced pressure, solvent removal was carried out for approximately 3 hours, and an aqueous polyurethane resin composition having a solid content of 40% by mass was obtained. In the obtained composition, the content of carboxyl groups and carboxylate groups in the polyurethane resin was 1.3% by mass. Furthermore, the obtained composition was an extremely stable emulsion exhibiting no separation and sedimentation with time.

Example 5

In a four-necked flask provided with a stirrer, a reflux condenser tube, a thermometer, and a nitrogen inlet tube, under a stream of nitrogen gas, 160.6 g of polybutylene adipate diol (number average molecular weight: 2000), 100.3 g of the polyester polyol having a carboxyl group obtained in Preparation Example 1 and 87.5 g of acetone were added and mixed uniformly. Thereafter, 89.1 g of isophorone diisocyanate was added thereto, and then 0.5 g of dibutyltin dilaurate was added thereto. Then, after the temperature was raised to 70° C., a reaction was carried out for approximately 2 hours, and then an acetone solution of an isocyanate group terminated prepolymer having 4.2% by mass of free isocyanate groups relative to a nonvolatile fraction was obtained. Here, the value of a/b in the prepolymer manufacturing was 100/45.

After the obtained acetone solution of prepolymer was cooled down to 30° C., and neutralized by adding 10.1 g of triethylamine, 62.5 g of acetone, 8.4 g of ethylene diamine, and 1.4 g of ion-exchange water were added thereto, a chain elongation reaction was carried out for approximately 1 hour at 40 to 50° C. until a free isocyanate group content of 0.2% by mass or less was achieved, and an acetone solution of polyurethane resin was obtained. Here, the value of a/(b+c) in the chain elongation reaction was 100/80, and the value of a/(b+c+2d) was 100/100.

Next, 551.4 g of ion-exchange water was gradually added to the obtained acetone solution of polyurethane resin so as to achieve emulsification dispersion of the polyurethane resin. After the temperature was raised to 40° C. under a reduced pressure, solvent removal was carried out for approximately 3 hours, and an aqueous polyurethane resin composition having a solid content of 40% by mass was obtained. In the obtained composition, the content of carboxyl groups and carboxylate groups in the polyurethane resin was 1.3% by mass. Furthermore, the obtained composition was an extremely stable emulsion exhibiting no separation and sedimentation with time.

Example 6

In a four-necked flask provided with a stirrer, a reflux condenser tube, a thermometer, and a nitrogen inlet tube, under a stream of nitrogen gas, 177.9 g of polybutylene adipate diol (number average molecular weight: 2000), 101.6 g of the polyester polyol having a carboxyl group obtained in Preparation Example 1, and 87.5 g of acetone were added and mixed uniformly. Thereafter, 70.5 g of isophorone diisocyanate was added thereto, and then 0.5 g of dibutyltin dilaurate was added thereto. Then, after the temperature was raised to 70° C., a reaction was carried out for approximately 3 hours, and then an acetone solution of an isocyanate group terminated prepolymer having 2.4% by mass of free isocyanate groups relative to a nonvolatile fraction was obtained. Here, the value of a/b in the prepolymer manufacturing was 100/60.

After the obtained acetone solution of prepolymer was cooled down to 30° C., and neutralized by adding 9.2 g of triethylamine, 62.5 g of acetone, 5.7 g of ethylene diamine, and 0.57 g of ion-exchange water were added thereto, a chain elongation reaction was carried out for approximately 1 hour at 40 to 50° C. until a free isocyanate group content of 0.2% by mass or less was achieved, and an acetone solution of polyurethane resin was obtained. Here, the value of a/(b+c) in the chain elongation reaction was 100/90, and the value of a/(b+c+2d) was 100/100.

Next, 534.8 g of ion-exchange water was gradually added to the obtained acetone solution of polyurethane resin so as to achieve emulsification dispersion thereof. After the temperature was raised to 40° C. under a reduced pressure, solvent removal was carried out for approximately 3 hours, and an aqueous polyurethane resin composition having a solid content of 40% by mass was obtained. In the obtained composition, the content of carboxyl groups and carboxylate groups in the polyurethane resin was 1.3% by mass. Furthermore, the obtained composition was an extremely stable emulsion exhibiting no separation and sedimentation with time.

Example 7

In a four-necked flask provided with a stirrer, a reflux condenser tube, a thermometer, and a nitrogen inlet tube, under a stream of nitrogen gas, 40.14 g of polybutylene adipate diol (number average molecular weight: 2000), 220.8 g of the polyester polyol having a carboxyl group obtained in Preparation Example 1, and 87.5 g of acetone were added and mixed uniformly. Thereafter, 89.1 g of isophorone diisocyanate was added thereto, and then 0.5 g of dibutyltin dilaurate was added thereto. Then, after the temperature was raised to 70° C., a reaction was carried out for approximately 2 hours, and then an acetone solution of an isocyanate group terminated prepolymer having 3.1% by mass of free isocyanate groups relative to a nonvolatile fraction was obtained. Here, the value of a/b in the prepolymer manufacturing was 100/60.

After the obtained acetone solution of prepolymer was cooled down to 30° C., and neutralized by adding 20.1 g of triethylamine, 62.5 g of acetone, 7.2 g of ethylene diamine, and 0.7 g of ion-exchange water were added thereto, a chain elongation reaction was carried out for approximately 1 hour at 40 to 50° C. until a free isocyanate group content of 0.2% by mass or less was achieved, and an acetone solution of polyurethane resin was obtained. Here, the value of a/(b+c) in the chain elongation reaction was 100/90, and the value of a/(b+c+2d) was 100/100.

Next, 515.1 g of ion-exchange water was gradually added to the obtained acetone solution of polyurethane resin so as to achieve emulsification dispersion thereof. After the temperature was raised to 40° C. under a reduced pressure, solvent removal was carried out for approximately 3 hours, and an aqueous polyurethane resin composition having a solid content of 40% by mass was obtained. In the obtained composition, the content of carboxyl groups and carboxylate groups in the polyurethane resin was 2.8% by mass. Furthermore, the obtained composition was an extremely stable emulsion exhibiting no separation and sedimentation with time.

Example 8

In a four-necked flask provided with a stirrer, a reflux condenser tube, a thermometer, and a nitrogen inlet tube, under a stream of nitrogen gas, 163.3 g of polybutylene adipate diol (number average molecular weight: 2000), 114.27 g of the polyester polyol having a sulfonic acid group obtained in Preparation Example 2 and 87.5 g of acetone were added and mixed uniformly. Thereafter, 72.5 g of isophorone diisocyanate was added thereto, and then 0.5 g of dibutyltin dilaurate was added thereto. Then, after the temperature was raised to 70° C., a reaction was carried out for approximately 3 hours, and then an acetone solution of an isocyanate group terminated prepolymer having 2.5% by mass of free isocyanate groups relative to a nonvolatile fraction was obtained. Here, the value of a/b in the prepolymer manufacturing was 100/60.

After the obtained acetone solution of prepolymer was cooled down to 30° C., 62.5 g of acetone, 5.9 g of ethylene diamine, and 0.6 g of ion-exchange water were added thereto, and a chain elongation reaction was carried out for approximately 1 hour at 40 to 50° C. until a free isocyanate group content of 0.2% by mass or less was achieved to obtain an acetone solution of polyurethane resin. Here, the value of a/(b+c) in the chain elongation reaction was 100/90, and the value of a/(b+c+2d) was 100/100.

Next, 533.2 g of ion-exchange water was gradually added to the obtained acetone solution of polyurethane resin so as to achieve emulsification dispersion thereof. After the temperature was raised to 40° C. under a reduced pressure, solvent removal was carried out for approximately 3 hours, and an aqueous polyurethane resin composition having a solid content of 40% by mass was obtained. In the obtained composition, the content of sulfonic acid groups and sulfonate groups in the polyurethane resin was 3.4% by mass. Furthermore, the obtained composition was an extremely stable emulsion exhibiting no separation and sedimentation with time.

Comparative Example 1

In a four-necked flask provided with a stirrer, a reflux condenser tube, a thermometer, and a nitrogen inlet tube, under a stream of nitrogen gas, 170.5 g of polybutylene adipate diol (number average molecular weight: 2000), 102.3 g of the polyester polyol having a carboxyl group obtained in Preparation Example 1, 1.5 g of 1,4-butanediol, and 87.5 g of acetone were added and mixed uniformly. Thereafter, 75.7 g of isophorone diisocyanate was added thereto, and then 0.5 g of dibutyltin dilaurate was added thereto. Then, after the temperature was raised to 70° C., a reaction was carried out for approximately 4 hours, and then an acetone solution of an isocyanate group terminated prepolymer having 2.6% by mass of free isocyanate groups relative to a nonvolatile fraction was obtained. Here, the value of a/b in the prepolymer manufacturing was 100/60.

After the obtained acetone solution of prepolymer was cooled down to 30° C., and neutralized by adding 10.3 g of triethylamine, 552.8 g of ion-exchange water was gradually added thereto so as to achieve emulsification dispersion. Next, 8.2 g of ethylene diamine was added thereto, and a chain elongation reaction was carried out for 2 hours in the emulsion. Here, the value of a/(b+c) in the chain elongation reaction was theoretically 100/100.

Thereafter, the obtained emulsion of polyurethane resin was heated to 40° C. Solvent removal was carried out for approximately 3 hours, and an aqueous polyurethane resin composition having a solid content of 40% by mass was obtained. In the obtained composition, the content of carboxyl groups and carboxylate groups in the polyurethane resin was 1.3% by mass. Furthermore, the obtained composition was an extremely stable emulsion exhibiting no separation and sedimentation with time.

Comparative Example 2

In a four-necked flask provided with a stirrer, a reflux condenser tube, a thermometer, and a nitrogen inlet tube, under a stream of nitrogen gas, 170.5 g of polybutylene adipate diol (number average molecular weight: 2000), 102.3 g of the polyester polyol having a carboxyl group obtained in Preparation Example 1, 1.5 g of 1,4-butanediol, and 87.5 g of acetone were added and mixed uniformly. Thereafter, 75.7 g of isophorone diisocyanate was added thereto, and then 0.5 g of dibutyltin dilaurate was added thereto. Then, after the temperature was raised to 70° C., a reaction was carried out for approximately 3 hours, and then an acetone solution of an isocyanate group terminated prepolymer having 2.6% by mass of free isocyanate groups relative to a nonvolatile fraction was obtained. Here, the value of a/b in the prepolymer manufacturing was 100/60.

After the obtained acetone solution of prepolymer was cooled down to 30° C., and neutralized by adding 10.3 g of triethylamine, 549.7 g of ion-exchange water was gradually added thereto so as to achieve emulsification dispersion. Next, 6.1 g of ethylene diamine was added thereto, and a chain elongation reaction was carried out for 2 hours in the emulsion. Here, the value of a/(b+c) in the chain elongation reaction was 100/90, and it was assumed that the remaining isocyanate group reacts with ion-exchange water serving as an emulsifying solvent.

Thereafter, the obtained emulsion of polyurethane resin was heated to 40° C. under a reduced pressure. Then solvent removal was carried out for approximately 3 hours, and an aqueous polyurethane resin composition having a solid content of 40% by mass was obtained. In the obtained composition, the content of carboxyl group and carboxylate group in the polyurethane resin was 1.3% by mass. Furthermore, the obtained composition was an extremely stable emulsion exhibiting no separation and sedimentation with time.

Comparative Example 3

In a four-necked flask provided with a stirrer, a reflux condenser tube, a thermometer, and a nitrogen inlet tube, under a stream of nitrogen gas, 170.5 g of polybutylene adipate diol (number average molecular weight: 2000), 102.3 g of the polyester polyol having a carboxyl group obtained in Preparation Example 1, 1.5 g of 1,4-butanediol, and 87.5 g of acetone were added and mixed uniformly. Thereafter, 75.7 g of isophorone diisocyanate was added thereto, and then 0.5 g of dibutyltin dilaurate was added thereto. Then, after the temperature was raised to 70° C., a reaction was carried out for approximately 4 hours, and then an acetone solution of an isocyanate group terminated prepolymer having 2.6% by mass of free isocyanate groups relative to a nonvolatile fraction was obtained. Here, the value of a/b in the prepolymer manufacturing was 100/60.

After the obtained acetone solution of prepolymer was cooled down to 30° C., and neutralized by adding 10.3 g of triethylamine, 62.5 g of acetone and 8.18 g of ethylene diamine were added thereto. Then, the solution was instantly thickened, and solidified 10 minutes after the initiation of the reaction. The solidified matter could not be dispersed in water; therefore, the manufacturing was abandoned. Here, the value of a/(b+c) in the chain elongation reaction was 100/100.

Comparative Example 4

In a four-necked flask provided with a stirrer, a reflux condenser tube, a thermometer, and a nitrogen inlet tube, under a stream of nitrogen gas, 170.5 g of polybutylene adipate diol (number average molecular weight: 2000), 102.3 g of the polyester polyol having a carboxyl group obtained in Preparation Example 1, 1.5 g of 1,4-butanediol, and 87.5 g of acetone were added and mixed uniformly. Thereafter, 75.7 g of isophorone diisocyanate was added thereto, and then 0.5 g of dibutyltin dilaurate was added thereto. Then, after the temperature was raised to 70° C., a reaction was carried out for approximately 3 hours, and then an acetone solution of an isocyanate group terminated prepolymer having 2.6% by mass of free isocyanate groups relative to a nonvolatile fraction was obtained. Here, the value of a/b in the prepolymer manufacturing was 100/60.

After the obtained acetone solution of prepolymer was cooled down to 30° C., and neutralized by adding 10.3 g of triethylamine, 62.5 g of acetone and 2.5 g of ion-exchange water were added thereto. Then, a chain elongation reaction was carried out for approximately 1 hour at 40 to 50° C. until a free isocyanate group content of 0.2% by mass or less was achieved, and then an acetone solution of polyurethane resin was obtained. Here, in the chain elongation reaction, the value of a/(b+c) was 100/60, and the value of a/(b+c+2d) was 100/100. The prepolymer was subjected to the chain elongation reaction with the use of only ion-exchange water.

Next, 544.2 g of ion-exchange water was gradually added to the obtained acetone solution of polyurethane resin so as to achieve emulsification dispersion thereof. After the temperature was raised to 40° C. under a reduced pressure, solvent removal was carried out for approximately 3 hours, and an aqueous polyurethane resin composition having a solid content of 40% by mass was obtained. In the obtained composition, the content of carboxyl groups and carboxylate groups in the polyurethane resin was 1.3% by mass. Furthermore, the obtained composition was an extremely stable emulsion exhibiting no separation and sedimentation with time.

Comparative Example 5

In a four-necked flask provided with a stirrer, a reflux condenser tube, a thermometer, and a nitrogen inlet tube, under a stream of nitrogen gas, 251.6 g of polybutylene adipate diol (number average molecular weight: 2000), 13.8 g of 2,2-dimethylol propionic acid and 87.5 g of acetone were added and mixed uniformly. Thereafter, 84.6 g of isophorone diisocyanate was added thereto, and then 0.5 g of dibutyltin dilaurate was added thereto. Then, after the temperature was raised to 70° C., a reaction was carried out for approximately 1 hour, and then an acetone solution of an isocyanate group terminated prepolymer having 2.9% by mass of free isocyanate groups relative to a nonvolatile fraction was obtained. Here, the value of a/b in the prepolymer manufacturing was 100/60.

After the obtained acetone solution of prepolymer was cooled down to 30° C., and neutralized by adding 10.2 g of triethylamine, 62.5 g of acetone, 6.9 g of ethylene diamine, and 0.7 g of ion-exchange water were added thereto, and a chain elongation reaction was carried out for approximately 1 hour at 40 to 50° C. until a free isocyanate group content of 0.2% by mass or less was achieved, and then an acetone solution of polyurethane resin was obtained. Here, the value of a/(b+c) in the chain elongation reaction was 100/90, and the value of a/(b+c+2d) was 100/100.

Next, 574.4 g of ion-exchange water was gradually added to the obtained acetone solution of polyurethane so as to achieve emulsification dispersion of the polyurethane. After the temperature was raised to 40° C. under a reduced pressure, solvent removal was carried out for approximately 3 hours, and an aqueous polyurethane resin composition having a solid content of 40% by mass was obtained. In the obtained composition, the content of carboxyl groups and carboxylate groups in the polyurethane resin was 1.3% by mass. Furthermore, the obtained composition was an extremely stable emulsion exhibiting no separation and sedimentation with time.

Comparative Example 6

In a four-necked flask provided with a stirrer, a reflux condenser tube, a thermometer, and a nitrogen inlet tube, under a stream of nitrogen gas, 304.8 g of polybutylene adipate diol (number average molecular weight: 2000) and 87.5 g of toluene were added and mixed uniformly. Thereafter, 45.2 g of tolylene diisocyanate was added thereto. Then, after the temperature was raised to 70° C., a reaction was carried out for approximately 3 hours, and then a toluene solution of an isocyanate group terminated prepolymer having 2.0% by mass of free isocyanate groups relative to a nonvolatile fraction was obtained. Here, the value of a/b in the prepolymer manufacturing was 100/60.

The obtained toluene solution of prepolymer was cooled down to 30° C., and 62.5 of methyl ethyl ketone, 3.1 g of ethylene diamine, and 10.7 g of diethanolamine were added thereto. Then, a chain elongation reaction was carried out at 40 to 50° C. for approximately 1 hour until a free isocyanate group content of 0.2% by mass or less was achieved, and then a polyurethane resin solution containing hydroxyl group was obtained. The obtained polyurethane resin did not contain an acidic group, and the hydroxyl group content was 1.0% by mass. Furthermore, the obtained polyurethane resin solution was extremely stable without separation and gelation with time.

Then, the obtained polyurethane resin solution, which was used as a base compound of two-component adhesive agent, was mixed with an isocyanate-based curing agent (made by Asahi Kasei Corporation, "Duranate TPA-100," NCO content of 23% by mass) so as to achieve NCO/OH=80/100, and used as a two-component adhesive agent. The pot life of this adhesive agent was 2 hours at a room temperature of 25° C.

<Evaluation of Adhesive Agent>

Using the aqueous polyurethane resin compositions obtained in Examples 1 to 8 and Comparative Examples 1 to 5 directly as adhesive agents, laminated bodies (test pieces) were prepared. Meanwhile, a laminated body (test piece) was prepared by using the two-component adhesive agent obtained in Comparative Example 6. Then, according to the methods described above, the open time, adhesiveness, normal-state adhesiveness, and heat-resistant creeping properties of the adhesive agents were evaluated. The evaluation results are shown in Table 2. Here, the manufacturing conditions of the polyurethane resin compositions in Examples 1 to 8 and Comparative Examples 1 to 6 are shown in Table 1.

TABLE 1

|  |  | Example 1 | Example 2 | Example 3 | Example 4 | Example 5 | Example 6 | Example 7 | Example 8 |
|---|---|---|---|---|---|---|---|---|---|
| A | isoporone diisocyanate | ○ | ○ | ○ | ○ | ○ | ○ | ○ | ○ |
|  | tolylene diisocyanate |  |  |  |  |  |  |  |  |
| $B_1$ | Preparation Example 1 | ○ |  | ○ | ○ |  | ○ | ○ |  |
|  | Preparation Example 2 |  | ○ |  |  |  |  |  | ○ |
| $B_2$ | polybutylene adipate diol | ○ | ○ | ○ | ○ |  | ○ | ○ | ○ |
| $B_3$ | 1,4-butane diol | ○ | ○ | ○ | ○ |  |  |  |  |
|  | 2,2-dimethylol propionic acid |  |  |  | ○ | ○ |  |  |  |
| C | ethylene diamine | ○ | ○ | ○ | ○ | ○ | ○ | ○ | ○ |
| D | ion-exchange water | ○ | ○ | ○ | ○ | ○ | ○ | ○ | ○ |
| — | diethanolamine |  |  |  |  |  |  |  |  |
| Blending condition |  |  |  |  |  |  |  |  |  |
| a/b |  | 100/60 | 100/60 | 100/70 | 100/70 | 100/45 | 100/60 | 100/60 | 100/60 |
| a/(b + c) |  | 100/90 | 100/90 | 100/85 | 100/85 | 100/80 | 100/90 | 100/90 | 100/90 |
| a/(b + c + 2d) |  | 100/100 | 100/100 | 100/100 | 100/100 | 100/100 | 100/100 | 100/100 | 100/100 |
| Condition for chain elongation reaction |  | before emulsification | before emulsification | before emulsification | before emulsification | before emulsification | before emulsification | before emulsification | before emulsification |
| Method for adding amine and water |  | added together | added together | added separately (EDA –> water) | added separately (water –> EDA) | added together | added together | added together | added together |
| Content (% by mass) |  |  |  |  |  |  |  |  |  |
| COOH/COO− |  | 1.3 | — | 1.3 | 1.3 | 1.3 | 1.3 | 2.8 | — |
| $SO_3H/SO_3^-$ |  | — | 1.3 | — | — | — | — | — | 3.4 |
| OH |  | — | — | — | — | — | — | — | — |

|  |  | Comparative Example 1 | Comparative Example 2 | Comparative Example 3 | Comparative Example 4 | Comparative Example 5 | Comparative Example 6 |
|---|---|---|---|---|---|---|---|
| A | isophorone diisocyanate | ○ | ○ | ○ | ○ | ○ |  |
|  | tolylene diisocyanate |  |  |  |  |  | ○ |
| $B_1$ | Preparation Example 1 | ○ | ○ | ○ | ○ |  |  |
|  | Preparation Example 2 |  |  |  |  |  |  |
| $B_2$ | polybutylene adipate diol | ○ | ○ | ○ | ○ | ○ | ○ |
| $B_3$ | 1,4-butane diol | ○ | ○ | ○ | ○ |  | ○ |
|  | 2,2-dimethylol propionic acid |  |  |  |  | ○ |  |
| C | ethylene diamine | ○ | ○ | ○ |  | ○ |  |
| D | ion-exchange water |  |  |  | ○ | ○ |  |
| — | diethanolamine |  |  |  |  |  | ○ |
| Blending condition |  |  |  |  |  |  |  |
| a/b |  | 100/60 | 100/60 | 100/60 | 100/60 | 100/60 | 100/100 |
| a/(b + c) |  | 100/100 | 100/90 | 100/90 | 100/90 | 100/90 | — |
| a/(b + c + 2d) |  | — | — | 100/100 | 100/100 | 100/100 | 100/100 |
| Condition for chain elongation reaction |  | after emulsification | after emulsification | before emulsification | before emulsification | before emulsification | in solvent |
| Method for adding amine and water |  | — | — | — | — | added together | — |
| Content (% by mass) |  |  |  |  |  |  |  |
| COOH/COO− |  | 1.3 | 1.3 | 1.3 | 1.3 | 1.3 | — |
| $SO_3H/SO_3^-$ |  | — | — | — | — | — | — |
| OH |  | — | — | — | — | — | 1.0 |

TABLE 2

|  | Example 1 | Example 2 | Example 3 | Example 4 | Example 5 | Example 6 | Example 7 | Example 8 |
|---|---|---|---|---|---|---|---|---|
| Open time | 30 minutes | 30 minutes | 20 minutes | 30 minutes | 15 minutes | 30 minutes | 20 minutes | 20 minutes |
| Adhesiveness (peeling strength) |  |  |  |  |  |  |  |  |
| 30° C. press | 90 N/cm | 95 N/cm | 80 N/cm | 85 N/cm | 70 N/cm | 100 N/cm | 75 N/cm | 80 N/cm |
| 50° C. press | 110 N/cm | 110 N/cm | 85 N/cm | 90 N/cm | 80 N/cm | 110 N/cm | 85 N/cm | 90 N/cm |
| 70° C. press | 110 N/cm | 120 N/cm | 85 N/cm | 100 N/cm | 85 N/cm | 110 N/cm | 100 N/cm | 105 N/cm |
| 100° C. press | 120 N/cm | 120 N/cm | 90 N/cm | 110 N/cm | 95 N/cm | 120 N/cm | 120 N/cm | 110 N/cm |
| Normal-state adhesive | 110 N/cm | 110 N/cm | 100 N/cm | 120 N/cm | 85 N/cm | 120 N/cm | 120 N/cm | 110 N/cm |
| Heat-resistant creeping property | A | A | A | A | A | A | A | A |

TABLE 2-continued

| | Comparative Example 1 | Comparative Example 2 | Comparative Example 3 | Comparative Example 4 | Comparative Example 5 | Comparative Example 6 |
|---|---|---|---|---|---|---|
| Open time | 5 minutes | 50 minutes | no evaluation | 50 minutes | 5 minutes | 10 minutes |
| Adhesiveness (peeling strength) | | | | | | |
| 30° C. press | 5 N/cm | 20 N/cm | | 65 N/cm | 35 N/cm | 65 N/cm |
| 50° C. press | 10 N/cm | 25 N/cm | | 70 N/cm | 43 N/cm | 70 N/cm |
| 70° C. press | 40 N/cm | 35 N/cm | | 75 N/cm | 64 N/cm | 78 N/cm |
| 100° C. press | 80 N/cm | 40 N/cm | | 78 N/cm | 70 N/cm | 80 N/cm |
| Normal-state adhesive | 35 N/cm | 30 N/cm | | 72 N/cm | 60 N/cm | 75 N/cm |
| Heat-resistant creeping property | C | C | | C | A | B |

As apparent from the results shown in Table 1 and Table 2, it was confirmed that, in the case where one-component adhesive agents of the present invention respectively made of the aqueous polyurethane resin compositions (Examples 1 to 8) of the present invention were used, both the open time and adhesiveness were excellent. Furthermore, it was confirmed that the peeling strength of obtained laminated bodies was high, the adhesiveness thereof was excellent, and the heat creep resistance was also good. Note that, even if a laminated body was prepared at a low temperature of 30° C., the peeling strength thereof was high. Therefore, it was confirmed that the aqueous polyurethane resin compositions of the present invention were excellent in adhesiveness at a low temperature.

Meanwhile, the aqueous polyurethane resin composition of the present invention virtually does not contain an organic solvent. Accordingly, different from the adhesive agent made of the organic solvent-based polyurethane resin used in Comparative Example 6, the aqueous polyurethane resin composition of the present invention had no solvent odor. Furthermore, as a matter of course, being a one-component adhesive agent, pot life of adhesive agent is not concerned.

On the other hand, in the case where the neutralized prepolymer having a terminal isocyanate group was subjected to a chain elongation reaction after emulsification dispersion (Comparative Examples 1 and 2), even if a laminated body is prepared under the heat-press condition of a high temperature (100° C.), the peeling strength thereof was low. The laminated body prepared at a low temperature condition (30 to 50° C.) had significantly lowered peeling strength. The normal-state adhesiveness and heat creep resistance were also significantly poor. Therefore, it was confirmed that the polyurethane resin compositions obtained in Comparative Examples 1 and 2 had problems in durability, such as adhesiveness and heat resistance.

Meanwhile, in the case where a chain elongation reaction was carried out only with the polyamine (C) (Comparative Example 3), even the preparation of an aqueous polyurethane resin composition was impossible. Furthermore, in the case where a chain elongation reaction was carried out only with water (Comparative Example 4), the open time was extremely long and the adherence at a low temperature was excellent; however, the heat creep resistance was poor and no durability was observed.

In the meantime, in the case where a polyester polyol having an acidic group was not used as a row material (Comparative Example 5), although the heat creep resistance was good, the open time was short. In addition, a laminated body prepared in the heat press condition of a high temperature (100° C.) had peeling strength for practical applications although it had a slightly low peeling strength, while a laminated body prepared under a low temperature condition (30 to 50° C.) had a significantly lowered peeling strength.

INDUSTRIAL APPLICABILITY

As described above, according to the present invention, it is possible to provide the aqueous polyurethane resin either containing an organic solvent as little as possible or containing no organic solvent at all, the aqueous polyurethane resin composition having a long open time and adhesiveness, especially excellent adhesiveness even at a low temperature in a range approximately from 30 to 60° C., and making it possible to obtain a laminated body having excellent adhesion strength and heat creep resistance.

Hence, by using the aqueous polyurethane resin composition of the present invention as a one-component adhesive agent, it is possible to stably manufacture a laminated body product, and to provide a laminated body having superior grade and quality.

The invention claimed is:

1. A method for manufacturing an aqueous polyurethane resin composition, comprising the steps of:

obtaining a neutralized prepolymer having a terminal isocyanate group by reacting a polyisocyanate (A) and a polyfunctional compound (B) containing a polyester polyol ($B_1$) having an acidic group and at least one member selected from the group consisting of other polyols ($B_2$) and chain extenders ($B_3$) so as to satisfy a condition expressed by the following mathematical formula (1); and obtaining an aqueous polyurethane resin composition by subjecting the neutralized prepolymer having a terminal isocyanate group to a chain elongation reaction with the use of a polyamine (C) containing at least two groups selected from the group consisting of an amino group and an imino group and water (D) so as to satisfy conditions expressed by the following formulas (2) and (3) to obtain a elongated product, and then dispersing the elongated product into water:

$$100/80 \leq a/b \leq 100/40 \quad (1)$$

$$100/98 \leq a/(b+c) \leq 100/80 \quad (2)$$

$$100/105 \leq a/(b+c+2d) \leq 100/95 \quad (3)$$

wherein in formulas (1) to (3), a represents the number of isocyanate groups (NCO) contained in the polyisocyanate (A), b represents the number of hydroxyl groups (OH) contained in the polyfunctional compound (B), c represents the number of the groups selected from the group consisting of an amino group ($NH_2$) and an imino group (NH) contained in the polyamine (C), and d represents the number of moles of the water (D).

2. The method for manufacturing an aqueous polyurethane resin composition according to claim 1, wherein the neutralized prepolymer having a terminal isocyanate group is obtained by reacting the polyisocyanate (A) and the polyfunctional compound (B) so as to satisfy a condition expressed by the following mathematical formula (4):

$$100/75 \leq a/b \leq 100/50 \tag{4}$$

wherein in formula (4), a represents the number of isocyanate groups (NCO) contained in the polyisocyanate (A), and b represents the number of hydroxyl groups (OH) contained in the polyfunctional compound (B).

3. The method for manufacturing an aqueous polyurethane resin composition according to claim 1, wherein the neutralized prepolymer having a terminal isocyanate group is subjected to a chain elongation reaction with the use of the polyamine (C) and the water (D) so as to satisfy conditions expressed by the following mathematical formulas (5) and (6):

$$100/95 \leq a/(b+c) \leq 100/85 \tag{5}$$

$$100/100 \leq a/(b+c+2d) \leq 100/98 \tag{6}$$

wherein in the formulas (5) and (6), a represents the number of isocyanate groups (NCO) contained in the polyisocyanate (A), b represents the number of hydroxyl groups (OH) contained in the polyfunctional compound (B), c represents the number of the groups selected from the group consisting of an amino group ($NH_2$) and an imino group (NH) contained in the polyamine (C), and d represents the number of moles of the water (D).

4. The method for manufacturing an aqueous polyurethane resin composition according to claim 1, wherein a content of acidic groups in a polyurethane resin in the aqueous polyurethane resin composition and anionic groups obtained by neutralizing the acidic groups is in a range from 0.5 to 3.0% by mass relative to the mass of the polyurethane resin.

* * * * *